United States Patent [19]

Baugh

[11] Patent Number: 5,004,273

[45] Date of Patent: Apr. 2, 1991

[54] TIEBACK THREAD WITH ANGULAR FREEDOM

[76] Inventor: Benton F. Baugh, 14626 Oak Bend, Houston, Tex. 77079

[21] Appl. No.: 371,599

[22] Filed: Jun. 26, 1989

[51] Int. Cl.⁵ .............................................. F16L 35/00
[52] U.S. Cl. .................................. 285/27; 285/332.1; 285/334.2; 285/390; 166/341; 405/169
[58] Field of Search ................. 285/27, 140, 141, 144, 285/145, 146, 147, 148, 176, 177, 178, 332, 332.1, 334.2, 390; 411/414, 426; 166/341, 338, 344, 355, 360; 405/169, 195

[56] References Cited

U.S. PATENT DOCUMENTS

| | | | |
|---|---|---|---|
| 4,033,615 | 7/1977 | Miller, Jr. et al. | 285/390 X |
| 4,429,904 | 2/1984 | Reimert | 285/27 X |
| 4,611,829 | 9/1986 | Hughes | 285/27 X |
| 4,629,224 | 12/1986 | Landriault | 285/390 X |
| 4,659,116 | 4/1987 | Cameron | 285/332.1 X |
| 4,823,919 | 4/1989 | Hayatdavoudi | 285/144 X |
| 4,846,506 | 7/1989 | Bocson et al. | 285/27 X |

OTHER PUBLICATIONS

"No-Cross", Pipe Coupling Circular, DRIL-QUIP, Inc., Houston, TX, 1986.

Primary Examiner—Dennis L. Taylor
Assistant Examiner—J. Russell McBee

[57] ABSTRACT

A pipe connection of a male threaded member and a female threaded member with a large degree of axial freedom which is allowed by a special thread profile which contours the bearing surfaces to allow the freedom for a pivoting movement about a pivot point without interference of primary and secondary bearing surfaces.

19 Claims, 4 Drawing Sheets

TIEBACK THREAD WITH ANGULAR FREEDOM

FIELD OF THE INVENTION

The present invention relates the area of threaded connections particularly for the purpose of connecting a string of pipe from the surface of the ocean to a fixed structure at or near the mudline, with the thread connection half on the string of pipe at an angular mismatch with respect to the thread connection half on the subsea fixed structure.

BACKGROUND OF THE INVENTION

Subsea oil and gas wells are frequently drilled at an early time and riser pipes are added to extend them to surface facilities which are installed later. Production of the wells would commence up the riser pipes after the surface facilities are installed.

Primary reasons for the early drilling of subsea wells are exploration to attempt to locate oil or gas reservoirs and predrilling while waiting on the manufacture of the surface facilities. In the later case as soon as the investment in the surface facilities is completed, return cash flow can be quickly started.

The surface facilities of interest can be fixed steel platforms, fixed concrete platforms, tension leg platforms, floating production facilities, or other styles. Each of these extend the well from the ocean floor to the surface by use of riser pipes.

A problem has historically existed in the connection of the riser pipes to the subsea facilities. The problem is misalignment of the approaching riser pipe to the axis of the subsea facilities. Angles are frequently seen in the range of one to two degrees. This misalignment can be caused by misalignment of the facilities or due to current forces on the riser pipes.

Conventional threads such as the typical square threads used to run the wellhead housing portion of 18 ¾" systems provide 0.010" minimum clearance between adjacent threads when measured parallel to the centerline of the connections. On a 19.50" mean diameter thread, the arctangent of this clearance divided by the mean diameter of the thread (arctan(0.010/19.5)) yields an allowable angle of 0.02938 degrees. More reasonably stated this is 1/34th of a degree. This is 1/68th of the typically required alignment.

Before these threads can be screwed together in a 1 or 2 degree mismatch condition, the pipes must be bent into alignment. Guides on platforms have been used to attempt this straightening process. In some cases cylindrical extensions on the threaded connections themselves are used to attempt this alignment process.

Bending the typical 20" pipes in a 2 degree angle, shoving the male and female thread leads into contact under the bind, and then screwing them together is a difficult and risky process at best. A specific problem with this process is that as the cylindrical extension are shoved together from hundreds of feet above, the lead thread will likely be impacted with a high force. If the orientation of the threads is such that only a small portion of the lead thread is actually contacted, permanent damage can be imparted to both pieces. In most cases the subsea facilities half of the thread is not retrievable. Grinding the thread by divers in deep water for repair will be an expensive and time consuming operation.

SUMMARY OF THE INVENTION

The first object of the present invention is to provide a threaded connection which can be threadedly engaged at angles typically encountered in offshore tieback operations without binding the male thread with the female thread.

A second object of this invention is to provide a threaded connection which provides a righting moment to a misaligned riser pipe without binding the threads.

A third object of the invention is to provide a connection with a relatively high degree of radial mismatch guidance and alignment.

Another object of the invention is provide a connection which can be threadedly engaged without requiring high axial forces which will tend to damage the lead on the thread when impacted.

DESCRIPTION OF THE PREFERRED EMBODIMENT

Figure 1:
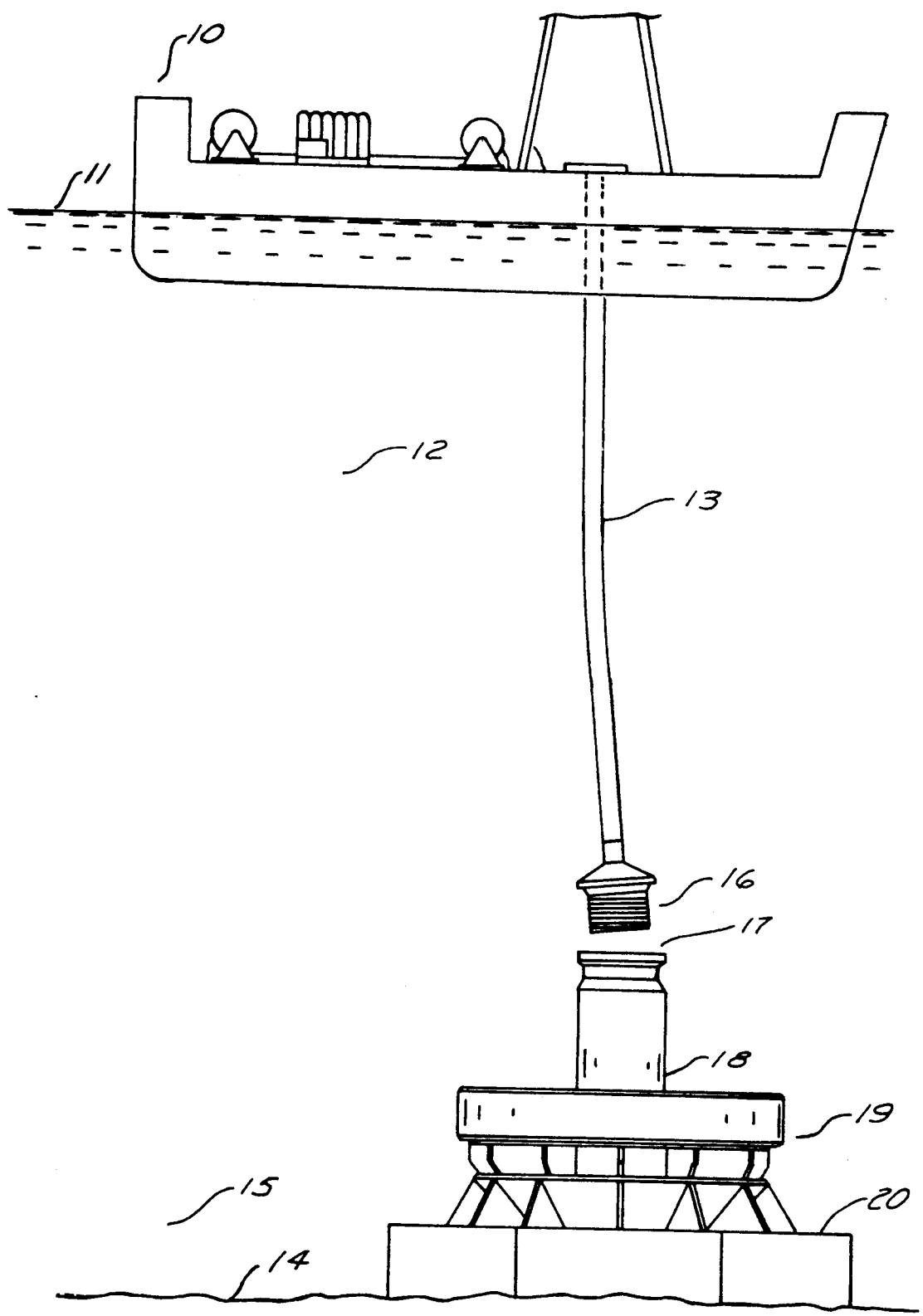
FIG. 1 is a schematic representation of an offshore production situation in which a riser pipe is in the process of being tied back to a subsea facility.

Referring now to FIG. 1, a vessel 10 is shown floating upon the surface 11 of the body of water 12. A riser assembly 13 extends downwardly from the vessel 10 towards seafloor 14 at the bottom 15 of the body of water 12.

At the lower end of the riser assembly 13 is a male thread connection 16. Female thread 17 is placed within the upper end of the wellhead housing 18. Male thread connection 16 and female thread 17 are manufactured according to advantages of the present invention. It will be noted that the male thread connection 16 is approaching the wellhead housing 18 at a slight angle. In this case no fixed platform guides are causing this angular mismatch. In the floating vessel scenario such as this, the angle will be caused by subsea currents. The vessel 10 will move from directly above the wellhead housing 18 to allow the male thread connection 16 to be directly over the wellhead housing 18. The natural result is an angular mismatched between the male thread connection 16 and the wellhead housing 18.

The wellhead housing 18 is supported by a permanent guide structure 19 which is in turn supported on the seafloor 14 on a temporary guide base 20.

Figure 2:
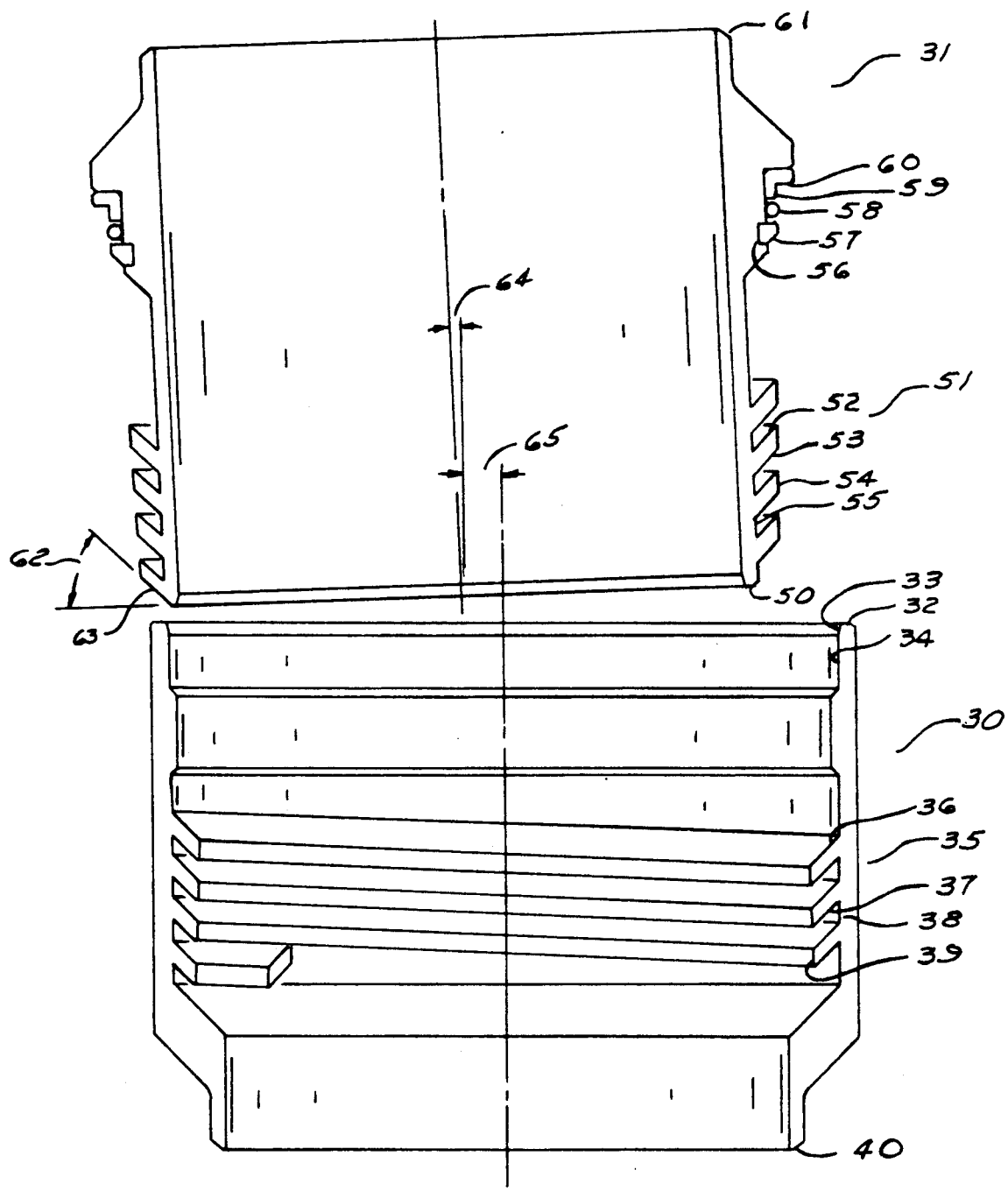
FIG. 2 is a section of a male and a female thread of the present invention which are about to be engaged at an angular and axial mismatch.

Referring now to FIG. 2, female threaded connection 30 has a thread similar to the female thread 17 in FIG. 1. Male threaded connection 31 is similar in construction to the male thread connection 16 on FIG. 1.

Female threaded connection 30 has an upper shoulder 32, a seal bore chamfer 33, a seal bore 34, a female thread 35, a secondary bearing surface 36, a primary bearing surface 37, a major diameter 38, a minor diameter 39, and a lower buttweld connection 40. The major diameter 50 in this embodiment is cylindrical and the minor diameter 39 is slightly conical in construction, with the diameter becoming greater as the thread progresses from surface 32.

Male thread connection 31 has a lower surface 50, a male thread 51, a primary bearing surface 52, a secondary bearing surface 53, a major diameter 54, a minor diameter 55, a groove 56, a split ring 57 in the groove 56, a seal ring 58, a bearing ring 59, a shoulder 60, and an upper buttweld preparation 61. This minor diameter 55 in this embodiment is cylindrical and the major diameter 54 is slightly conical, with the diameter becoming slightly larger as the thread progresses further from the lower surface 50.

The angle 62 of this embodiment provides a feature of radial mismatch alignment in addition to the angular mismatch tolerance of this connection. This angle 62 effectively provides the chamfering as indicated at 63.

The term primary bearing surface is taken to be the surface on the thread profile which will be tightly loaded when the joint is made up against the shoulders (32 and 60) and to be the surface against which tension will be pulled when the threaded connection is pulled in tension. The term secondary bearing surface is taken to be the surface on the thread profile which will see some bearing loads during the making up process, but will typically to be separated when the connection is made up against the shoulders and will not support the tension loadings of the threaded connection.

These male and female threaded connections will be stabbed and engaged at both the angular mismatch shown at 64 and the radial mismatch shown at 65. Simply lowering the male thread connection 31 onto the female thread connection 30 will cause the chamfer at 63 to bring them into approximate radial alignment.

Right hand rotation will cause the male and female threads to engage and begin to screw together.

Figure 3:
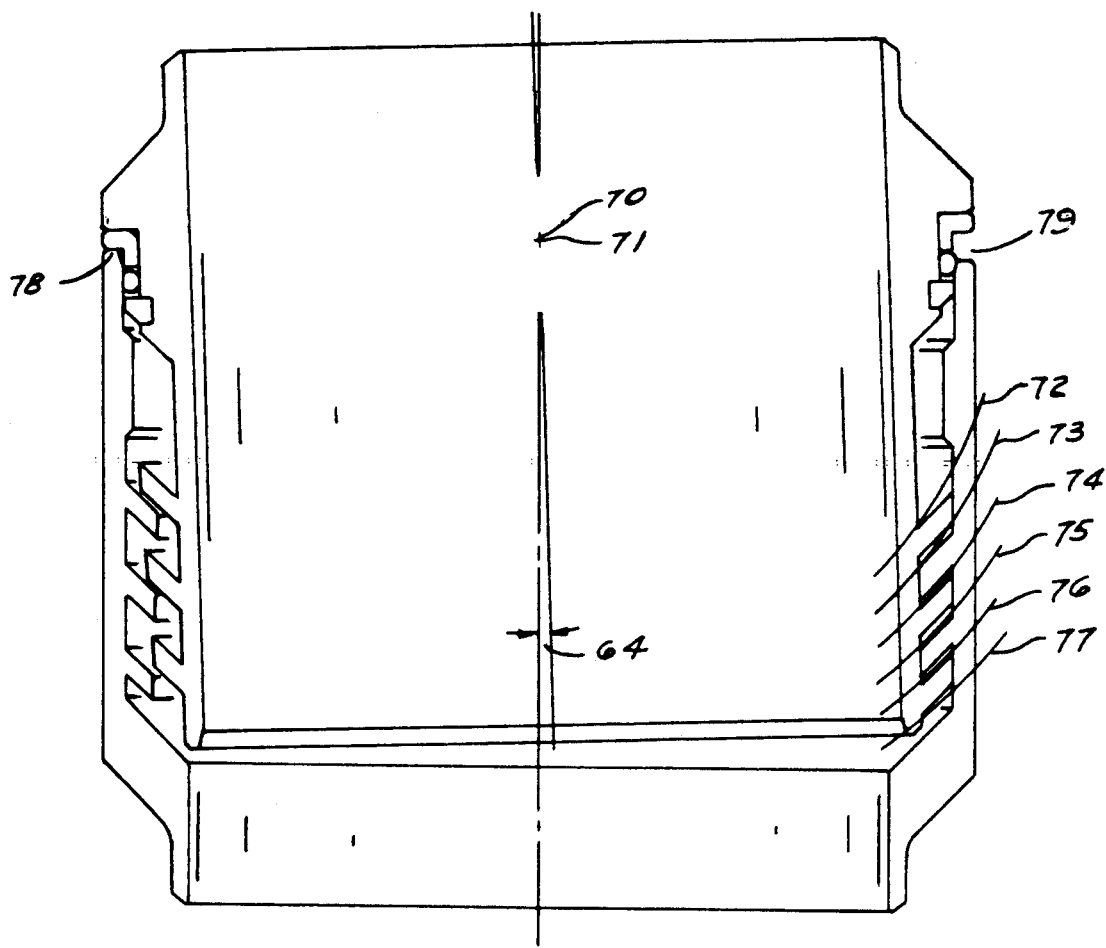
FIG. 3 shows the male and female thread of FIG. 2 almost completely engaged, yet still at the initial mismatch angle.

Referring now to FIG. 3, male thread connection 31 is screwed into female thread connection 30 until the shoulder 60 has contacted shoulder 32 at one point. The angular mismatch 64 still exists. The connection is almost completely screwed together without having to bend the connecting pipes.

A pivot point 70 exists on the centerline of male thread connection 31 and a pivot point 71 exists on the centerline of female thread 30. On this figure, the pivot points are in the indentical location. Circular arcs 72–77 are drawn about the pivot points 70 and 71 and between the corresponding primary bearing surfaces 37 and 52 and the secondary bearing surfaces 36 and 53 during the screwing process up to this point. The combinations of manufacturing angles such as that shown at 62 in FIG. 2 and the clearances between the corresponding primary bearing surfaces 37 and 52 and the secondary bearing surfaces 36 and 53 allow this capability at any point during the screwing process, up to this point.

It is understood that if the connection were put into tension at this point the clearances would all be between the secondary bearing surfaces 36 and 53 and that the primary bearing surfaces 37 and 52 would be in contact and no arc could be drawn between them. The arcs can be drawn between both surfaces when the available clearances are shared.

The circular arcs 72–77 are drawn at a particular plane thru the female threaded connection 30 and the male threaded connection 31. In like manner, similar arcs can be drawn in any plane which passes thru the centerline of the connection. Because of this geometric clearance, the male threaded connection 31 has full axial freedom with respect to female threaded connection 30 up to the angle 64.

It should be noted that the angle 64 shown on this figure is limited by the contact of the major diameters and/or the minor diameters. The conical shape of the major diameter of the male thread and the conical shape of the minor diameter of the female thread are optimized to contact the cylindrical major diameter of the female thread and cylindrical minor diameter of the male thread at the maximum angle of misalignment.

Futher rotation or screwing of the connections will cause loading of the shoulder 60 and the shoulder 32 at the one point. As the loading of the threads will be approximately centered about the centerline of the threads and the reacting force will be at the contact point 78, a moment will be caused which tends to align the male thread connection 31 with the female thread connection 30. This alignment will close the gap shown at 79.

Figure 4:
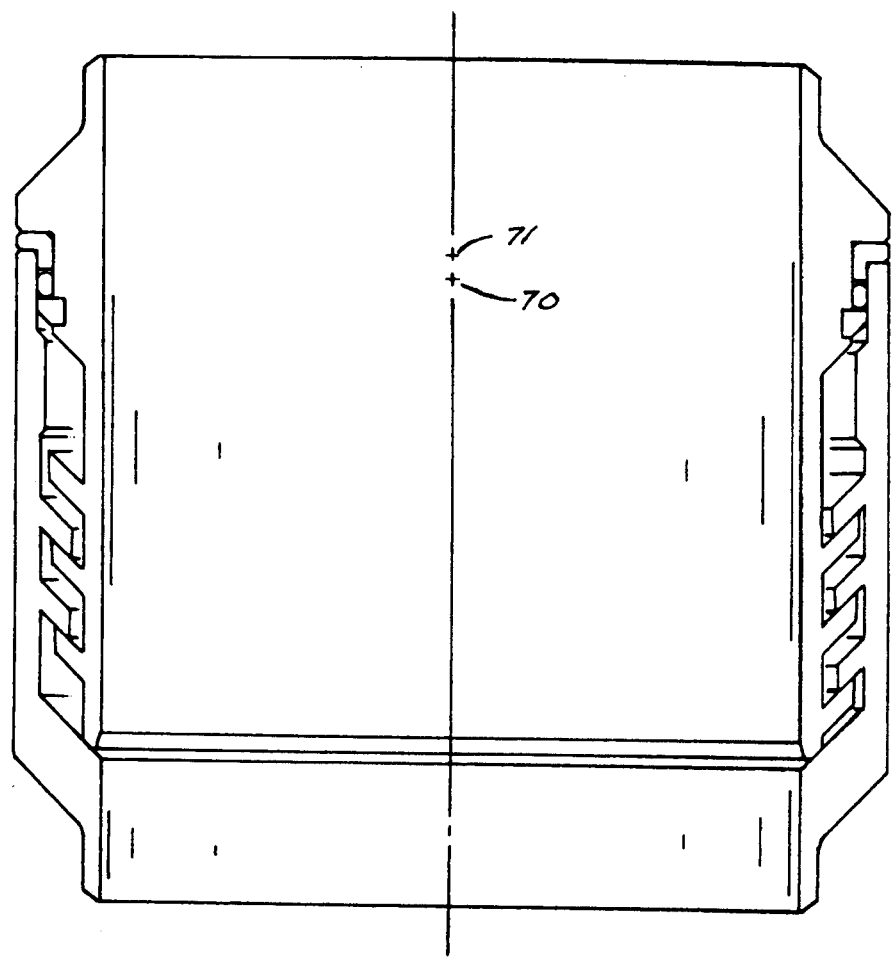
FIG. 4 shows the male and female threads of FIGS. 2 and 3 being fully made up and aligned.

Referring now to FIG. 4, the torque of screwing the male thread connection 31 into the female thread connection 30 has caused the alignment of the male thread connection 31 with the female thread connection 30, resulting in a tight and aligned connection. The pivot point 70 is shown as passing the pivot point 71 into its final position.

The foregoing disclosure and description of this invention are illustrative and explanatory thereof, and various changes in the size, shape, and materials, as well as the details of the illustrated construction may be made without departing from the spirit of the invention.

I claim:

1. A pipe connection comprising a male threaded member, a female threaded member, and a pivot point,
    said male threaded member having a male thread profile, and a first centerline,
    said female threaded member having a female thread profile, and a second centerline,
    said male thread profile having a first primary bearing surface, a first secondary bearing surface, a first major diameter, and a first minor diameter,
    said female thread profile having a second primary bearing surface, a second secondary bearing surface, a second major diameter, and a second minor diameter,
    said male thread profile and said female thread profile being configured such that when the pipe connection is partially engaged arcuate lines can be drawn about said pivot point and pass between said first and second primary bearing surfaces and between said first and second secondary bearing surfaces,
    such that contact between said first and second primary bearing surfaces or contact between said first or second secondary bearing surfaces does not limit the freedom to be axially misaligned of said first centerline of said male threaded member relative to the said second centerline of said female threaded member.

2. The invention of claim 1 wherein said pivot point is located at or about the centerline of said female threaded member.

3. The invention of claim 1 wherein said pivot point is located at or about the centerline of said male threaded member.

4. The invention of claim 1 wherein said pivot point is located at or about the centerline of said male threaded member and a second pivot point is located at or about the centerline of said female threaded member.

5. The invention of claim 1 wherein said freedom to be axially misaligned is limited when said first major diameter on said male threaded member contacts said second major diameter on said female threaded member.

6. The invention of claim 5 wherein said first major diameter is in the form of a frustum of a cone, with the larger end of said first major diameter being closer to said pivot point.

7. The invention of claim 1 wherein said freedom to be axially misaligned is limited when said first minor diameter on said male threaded member contacts said second minor diameter on said female threaded member.

8. A pipe connection comprising a male threaded member, a female threaded member, and a pivot point,
    said male threaded member having a male thread profile, and a first centerline,
    said female threaded member having a female thread profile, and a second centerline,
    said male thread profile having a first primary beearing surface, a first secondary bearing surface, a first major diameter, and a first minor diameter,
    said female thread profile having a second primary bearing surface, a second secondary bearing surface, a second major diameter, and a second minor diameter,
    said male thread profile and said female thread profile being configured such that when the pipe connection is partially engaged arcuate lines can be drawn about said pivot point and pass between said first and second primary bearing surfaces and between said first and second secondary bearing surfaces,
    such that contact between said first and second primary bearing surfaces or contact between said first or second secondary bearing surfaces does not limit the freedom to be axially misaligned of said first centerline of said male threaded member relative to the said second centerline of said female threaded member,
    wherein said freedom to be axially misaligned is limited when said first minor diameter on said male threaded member contacts said second minor diameter on said female threaded member,
    wherein said second minor diameter is in the form of a frustum of a cone, with the smaller end of said second minor diameter being closer to said pivot point.

9. A pipe connection comprising a male threaded member, a female threaded member, and a pivot point,
    said male threaded member having a male thread profile, a first stop shoulder, and a first centerline,
    said female threaded member having a female thread profile, a second stop shoulder, and a second centerline,
    said male thread profile having a first primary bearing surface, a first secondary bearing surface, a first major diameter, and a first minor diameter,
    said female thread profile having a second primary bearing surface, a second secondary bearing surface, a second major diameter, and a second minor diameter,
    said pivot point being located at or about the centerline of said female threaded member,
    said male thread profile and said female thread profile being configured such that when the pipe connection is partially engaged arcuate lines can be drawn about said pivot point and pass between said first and second primary bearing surfaces and between said first and second secondary bearing surfaces,
    such that contact between said first and second primary bearing surfaces or contact between said first or second secondary bearing surfaces does not limit the freedom to be axially misaligned of said first centerline of said male threaded member relative to the said second centerline of said female member relative to the said second centerline of said female threaded member,
    and such that when said first stop shoulder contacts said second stop shoulder and further rotation is imparted to said male threaded member relative to said female threaded member, said male threaded member is caused to be axially aligned with said female threaded member.

10. The invention of claim 9 wherein said freedom to be axially misaligned is limited when said first major diameter on said male threaded member contacts said second major diameter on said female threaded member.

11. The invention of claim 10 wherein said first major diameter is in the form of a frustum of a cone, with the larger end of said first major diameter being closer to said pivot point.

12. The invention of claim 9 wherein said freedom to be axially misaligned is limited when said first minor diameter on said male threaded member contacts said second minor diameter on said female threaded member.

13. A pipe connection comprising a male threaded member, a female threaded member, and a pivot point,
    said male threaded member having a male thread profile, a first stop shoulder, and a first centerline,
    said female threaded member having a female thread profile, a second stop shoulder, and a second centerline,
    said male thread profile having a first primary bearing surface, a first secondary bearing surface, a first major diameter, and a first minor diameter,
    said female thread profile having a second primary bearing surface, a second secondary bearing surface, a second major diameter, and a second minor diameter,
    said pivot point being located at or about the centerline of said female threaded member,
    said male thread profile and said female thread profile being configured such that when the pipe connection is partially engaged arcuate lines can be drawn about said pivot point and pass between said first and second primary bearing surfaces and between said first and second secondary bearing surfaces,
    such that contact between said first and second primary bearing surfaces or contact between said first or second secondary bearing surfaces does not limit the freedom to be axially misaligned of said first centerline of said male threaded member relative to the said second centerline of said female threaded member,
    and such that when said first stop shoulder contacts said second stop shoulder and further rotation is imparted to said male threaded member relative to said female threaded member, said male threaded member is caused to be axially aligned with said female threaded member,
    wherein said freedom to be axially misaligned is limited when said first minor diameter on said male threaded member contacts said second minor diameter on said female threaded member, wherein said second minor diameter is in the form of a frustum of a cone, with the smaller end of said second minor diameter being closer to said pivot point.

14. The invention of claim 1 wherein the angle of said secondary bearing surface at the end of said male threaded member offers a guidance taper for the entrance of said male threaded member into said female threaded member.

15. A thread profile comprising a male thread, a female thread, a male thread pivot point, and a female thread pivot point, said male thread being comprised of a male tooth profile, said male thread pivot point being located at or about the centerline of said male thread, such that equally spaced arcs of a first spacing can be drawn about said male thread pivot point, and further such that said male tooth profile is configured to be located between alternate of said equally spaced arcs, said female thread being comprised of a female tooth profile, said female thread pivot point being located at or about the centerline of said female thread, such that equally spaced arcs of said first spacing can be drawn about said female thread pivot point, and further such that said female tooth profile is configured to be located between alternate of said equally spaced arcs, said male tooth profile having a first major diameter and a first minor diameter and said female tooth profile having a second major diameter and a second minor diameter, such that when said male thread is partially engaged into said female thread said male thread will have a freedom to be axially misaligned relative to said female thread profile.

16. The invention of claim 15 wherein said freedom to be axially misaligned is limited when said first major diameter on said male threaded member contacts said second major diameter on said female threaded member.

17. The invention of claim 16 wherein said first major diameter is in the form of a frustum of a cone, with the larger end of said first major diameter being closer to said male thread pivot point.

18. The invention of claim 15 wherein said freedom to be axially misaligned is limited when said first minor diameter on said male threaded member contacts said second minor diameter on said female threaded member.

19. A thread profile comprising a male thread, a female thread, a male thread pivot point, and a female thread pivot point, said male thread being comprised of a male tooth profile, said male thread pivot point being located at or about the centerline of said male thread, such that equally spaced arcs of a first spacing can be drawn about said male thread pivot point, and further such that said male tooth profile is configured to be located between alternate of said equally spaced arcs, said female thread being comprised of a female tooth profile, said female thread pivot point being located at or about the centerline of said female thread, such that equally spaced arcs of said first spacing can be drawn about said female thread pivot point, and further such that said female tooth profile is configured to be located between alternate of said equally spaced arcs, said male tooth profile having a first major diameter and a first minor diameter and said female tooth profile having a second major diameter and a second minor diameter, such that when said male thread is partially engaged into said female thread said male thread will have a freedom to be axially misaligned relative to said female thread profile, wherein said freedom to be axially misaligned is limited when said first minor diameter on said male threaded member contacts said second minor diameter on said female threaded member, wherein said second minor diameter is in the form of a frustum of a cone, with the smaller end of said second minor diameter being closer to said female thread pivot point.

* * * * *